United States Patent
Chueh et al.

(10) Patent No.: US 12,462,172 B2
(45) Date of Patent: Nov. 4, 2025

(54) PARAMETER OPTIMIZATION DEVICE AND NON-TRANSITORY COMPUTER READABLE MEDIUM

(71) Applicant: INDUSTRIAL TECHNOLOGY RESEARCH INSTITUTE, Hsinchu (TW)

(72) Inventors: Chuang-Hua Chueh, Taipei (TW); Po-Yu Huang, Zhudong Township (TW); Shu-Hsuan Lin, New Taipei (TW); Yu-Hsiuan Chang, New Taipei (TW); Cheng-Wei Chen, Chiayi (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 803 days.

(21) Appl. No.: 17/830,040

(22) Filed: Jun. 1, 2022

(65) Prior Publication Data

US 2023/0153652 A1     May 18, 2023

(30) Foreign Application Priority Data

Nov. 16, 2021    (TW) ................................. 110142519

(51) Int. Cl.
    *G06F 7/00*        (2006.01)
    *G06N 5/022*      (2023.01)
    *G06N 5/04*        (2023.01)

(52) U.S. Cl.
    CPC ............... *G06N 5/04* (2013.01); *G06N 5/022* (2013.01)

(58) Field of Classification Search
    CPC ................................. G06N 5/04; G06N 5/022
(Continued)

(56) References Cited

U.S. PATENT DOCUMENTS 10,776,402 B2    9/2020   Wang et al.
10,901,832 B2    1/2021   Farahat et al.
(Continued)

FOREIGN PATENT DOCUMENTS

CN     110210623 A     9/2019
CN     110750948 A     2/2020
(Continued)

OTHER PUBLICATIONS

Groves et al., "Efficient and Scalable Batch Bayesian Optimization Using K-Means", arXiv:1806.01159v2 [stat.ML], Sep. 19, 2018, total 8 pages.

(Continued)

*Primary Examiner* — Isaac M Woo
(74) *Attorney, Agent, or Firm* — Birch, Stewart, Kolasch & Birch, LLP

(57) ABSTRACT

A parameter optimization device includes a data acquisition module, a sampling function calculation module, a clustering module and a parameter recommendation module. The data acquisition module is configured to acquire several input parameter values and corresponding several measurement output values. The sampling function calculation module is configured to obtain several sampling function values according to the input parameter values and the measurement output values. The clustering module is configured to obtain several parameter groups according to the input parameter values and the sampling function values. The parameter recommendation module is configured to obtain several recommended parameter values from at least one of the parameter groups.

10 Claims, 3 Drawing Sheets

(58) Field of Classification Search
USPC .................................. 707/600–899; 706/12
See application file for complete search history.

(56) References Cited

U.S. PATENT DOCUMENTS

| | | | |
|---|---|---|---|
| 2018/0068083 A1 | 3/2018 | Cohen et al. | |
| 2019/0022737 A1 | 1/2019 | Ma et al. | |
| 2020/0013511 A1* | 1/2020 | de Zambotti | G16H 50/20 |
| 2020/0097853 A1 | 3/2020 | Golovin et al. | |
| 2020/0111018 A1 | 4/2020 | Golovin et al. | |
| 2020/0167691 A1 | 5/2020 | Golovin et al. | |

FOREIGN PATENT DOCUMENTS

| | | |
|---|---|---|
| CN | 111460368 A | 7/2020 |
| CN | 111863143 A | 10/2020 |
| CN | 112182963 A | 1/2021 |
| TW | I549007 B | 9/2016 |
| TW | 202138988 A | 10/2021 |
| WO | WO 2012/010271 A1 | 1/2012 |
| WO | WO 2018/036622 A1 | 3/2018 |

OTHER PUBLICATIONS

Nguyen et al., "Budgeted Batch Bayesian Optimization", IEEE 16th International Conference on Data Mining, 2016, pp. 1107-1112.

Wang et al., "Batched Large-scale Bayesian Optimization in High-dimensional Spaces", Proceedings of the 21st International Conference on Artificial Intelligence and Statistics (AISTATS) 2018, Lanzarote, Spain, PMLR: vol. 84, total 10 pages.

Taiwanese Office Action and Search Report for Taiwanese Application No. 110142519, dated Dec. 9, 2022.

* cited by examiner

PARAMETER OPTIMIZATION DEVICE AND NON-TRANSITORY COMPUTER READABLE MEDIUM

This application claims the benefit of Taiwan application Serial No. 110142519, filed Nov. 16, 2021, the subject matter of which is incorporated herein by reference.

TECHNICAL FIELD

The disclosure relates in general to a parameter optimization device and a non-transitory computer readable medium.

BACKGROUND

In the parameter optimization method, one process parameter is output each time and input into a process, and a corresponding process result is measured. When the process result does not meet a process target value, the next process parameter could be recommended until the process result corresponding to the process parameter meets the process target value. However, it is time-consuming and inefficient for a process parameter recommendation method. Therefore, how to propose a new process of recommending the process parameter is one of the goals of those skilled in the art.

SUMMARY

According to an embodiment, a parameter optimization device is provided. The parameter optimization device includes a data acquisition module, a sampling function calculation module, a clustering module and a parameter recommendation module. The data acquisition module is configured for acquiring a plurality of input parameter values and corresponding a plurality of measurement output values. The sampling function calculation module is configured for obtaining a plurality of sampling function values according to the input parameter values and the measurement output values. The clustering module is configured for obtaining a plurality of parameter value groups according to the input parameter values and the sampling function values. The parameter recommendation module is configured for obtaining a plurality of recommended parameter values from at least one of the parameter value groups.

According to another embodiment, a non-transitory computer readable medium is provided. The non-transitory computer readable medium stores a program causing a computer to execute a parameter optimization method, and the parameter optimization method includes the following steps: acquiring a plurality of input parameter values and corresponding a plurality of measurement output values; obtaining a plurality of sampling function values according to the input parameter values and the measurement output values; obtaining a plurality of parameter value groups according to the input parameter values and the sampling function values; and obtaining a plurality of recommended parameter values from at least one of the parameter value groups.

The above and other aspects of the disclosure will become better understood with regard to the following detailed description of the preferred but non-limiting embodiment(s). The following description is made with reference to the accompanying drawings.

Figure 1:
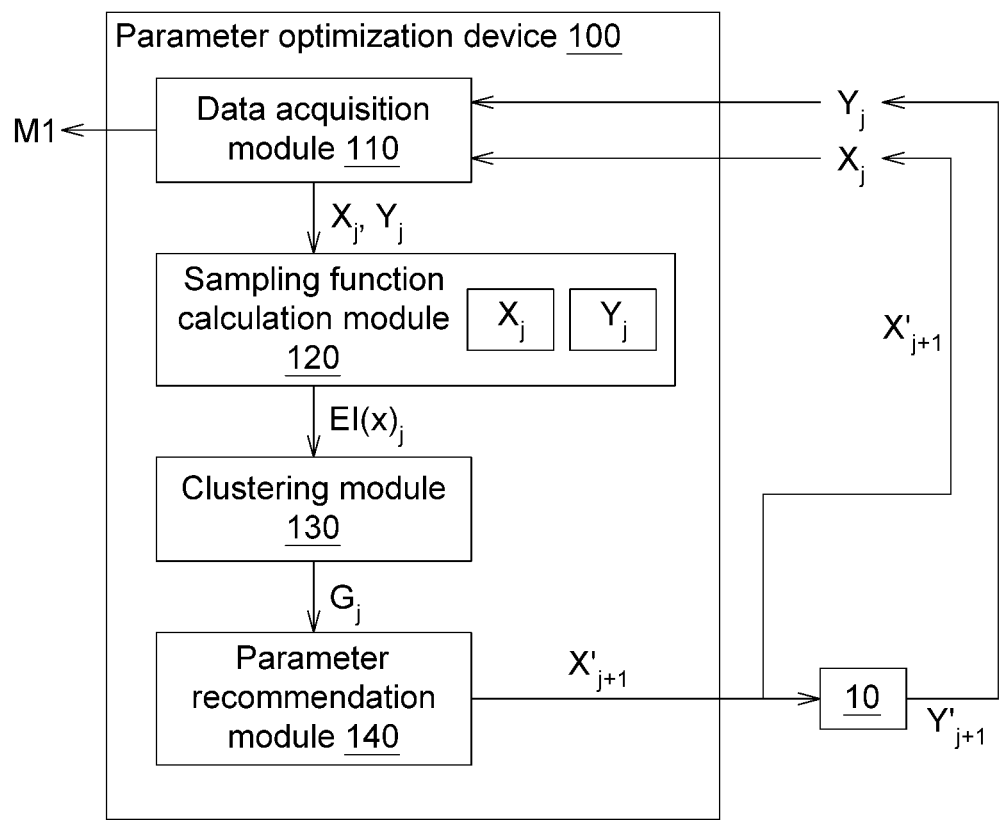
FIG. 1 shows a functional block diagram of a parameter optimization device according to an embodiment of the present disclosure.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Referring to FIG. 1, FIG. 1 shows a functional block diagram of a parameter optimization device 100 according to an embodiment of the present disclosure.

The parameter optimization device 100 includes a data acquisition module 110, a sampling function calculation module 120, a clustering module 130 and a parameter recommendation module 140.

The data acquisition module 110, the sampling function calculation module 120, the clustering module 130 and/or the parameter recommendation module 140 are, for example, software, firmware and/or hardware. In an embodiment, the data acquisition module 110, the sampling function calculation module 120, the clustering module 130 and/or the parameter recommendation module 140 are, for example, physical circuits formed by semiconductor process. At least two of the data acquisition module 110, the sampling function calculation module 120, the clustering module 130 and the parameter recommendation module 140 could be integrated into a single module. Alternatively, at least one of the data acquisition module 110, the sampling function calculation module 120 and the clustering module 140 could be integrated into a processor or a controller of a computer. In another embodiment, at least one of the data acquisition module 110, the sampling function calculation module 120, the clustering module 130 and the parameter recommendation module 140 could be at least a portion of the computer.

The data acquisition module 110 is configured for acquiring a number of input parameter values $X_j$ and a number of corresponding measurement output values $Y_j$. The sampling function calculation module 120 is configured for obtaining a number of sampling function values $EI(x)_j$ according to the input parameter values $X_j$ and the measurement output values $Y_j$. The clustering module 130 is configured for obtaining a number of parameter value groups Gj according to the input parameter values Xj and the sampling function values $EI(x)_j$. The parameter recommendation module 140 is configured for obtaining a number of recommended parameter values $X'_{j+1}$ from at least one of the parameter value groups $G_j$. In the present embodiment, multiple recommended parameter values $X'_{j+1}$ could be generated at one time, and thus multiple measurement output values (process result) could be obtained, through measuring in one measurement batch, based on the recommended parameter values $X'_{j+1}$. As a result, it could reduce the number of measurement batches to reduce the required time of the entire optimization process and quickly obtain the optimized recommended parameter value that meet the output target value (process target).

The subscript j of the symbol indicates a batch (or iteration). For example, the input parameter value $X_j$ and the measurement output value $Y_j$ represent the values of the current batch (or the current iteration), and the recommended parameter value $X'_{j+1}$ represents the value for the next batch (or the next iteration).

In an embodiment, each input parameter value $X_j$ is, for example, a value of a process parameter type in a process. The process parameter type includes, for example, various process parameters in the process, such as flow rate, pressure, temperature, humidity and composition ratio, etc. and the process is, for example, various processes that need or are capable of performing parameter optimization, such as mechanical design, mechanical manufacturing process, semiconductor process, chemical process, etc. The process is performed with the input parameter value $X_j$, and then a measured value of the process result is the measurement output value $Y_j$, such as epitaxial layer thickness, process yield, minimum cost, maximum efficiency, productivity, etc. The recommended parameter value $X'_{j+1}$ is the parameter value recommended after performing the optimization process in current batch, and the recommended parameter value $X'_{j+1}$ could be added to the operation of the optimization process in the next batch. In addition, the number of the input parameter values $X_j$ and/or the number of the recommended parameter values $X'_{j+1}$ could depend on the measurement capability of the process. For example, the process equipment 10 of the process (the process equipment 10 is shown in FIG. 1) has capability of measuring up to N output values in a batch, and the number of the input parameter values $X_j$ and/or the number of the recommended parameter values $X'_{j+1}$ could be equal to or less than N, wherein N is any positive integer equal to or greater than 2. Furthermore, the number of the input parameter values $X_j$ could be equal to the number of the recommended parameter values $X'_{j+1}$. In an embodiment, the process equipment 10 itself possesses measurement function. In another embodiment, the process equipment 10 itself does not possess the measurement function, but could provide the measurement function through an external measurement equipment.

Figure 2:
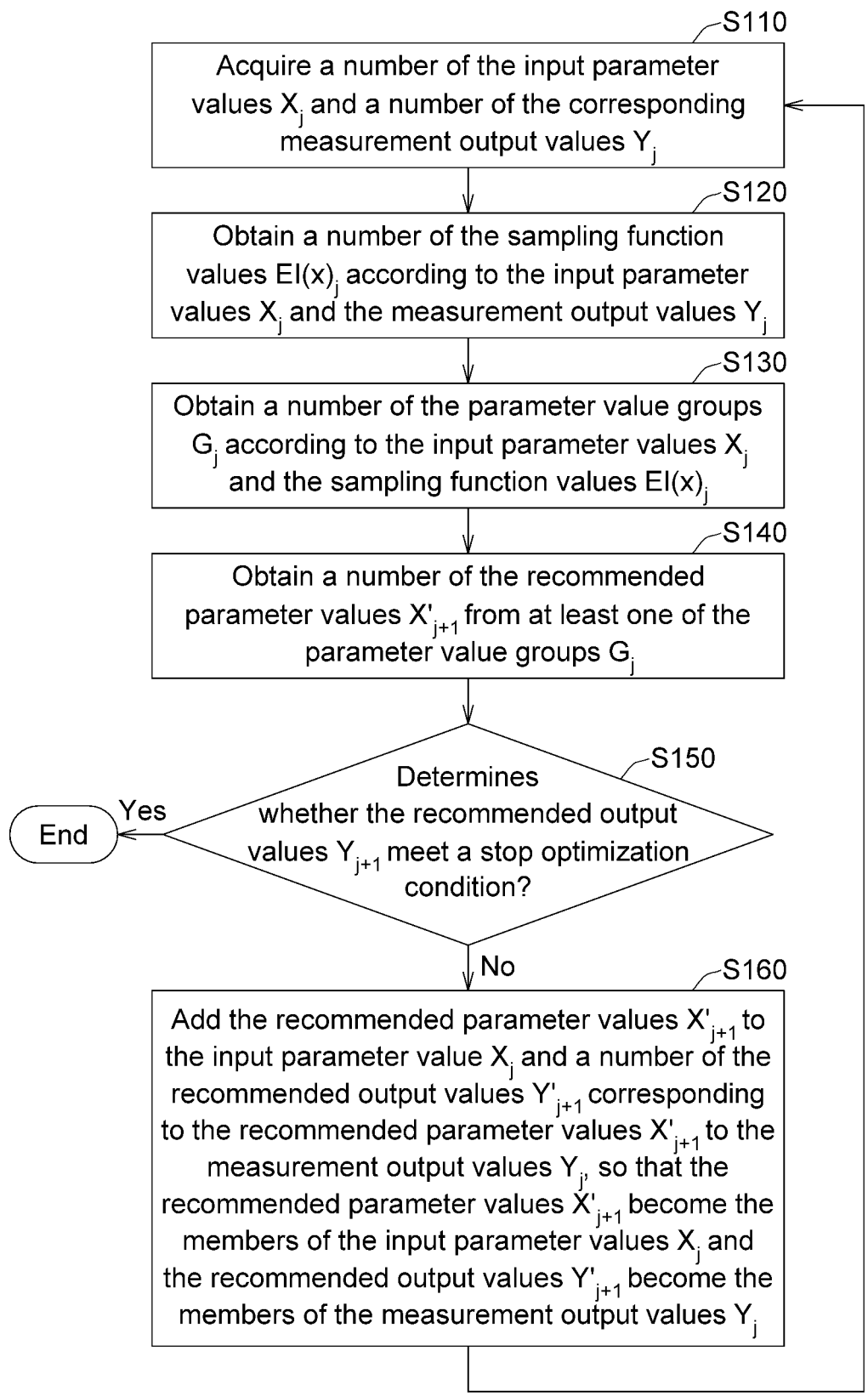
FIG. 2 shows a flowchart of the parameter optimization device according to FIG. 1.

Referring to FIG. 2, FIG. 2 shows a flowchart of the parameter optimization device 100 according to FIG. 1.

In step S110, the data acquisition module 110 acquires a number of the input parameter values $X_j$ and a number of the corresponding measurement output values $Y_j$. In each batch (iteration), at least two input parameter values $X_j$ and at least two measurement output values $Y_j$ participate in the optimization operation. The embodiments of the present disclosure do not limit the number of the input parameter values and the number of the measurement output values participated in the operation in each batch. The larger the number of the input parameter values is, the faster the optimization process could be completed (for example, the number of iterations is smaller).

In step S120, the sampling function calculation module 120 obtains a number of the sampling function values $EI(x)_j$ according to the input parameter values $X_j$ and the measurement output values $Y_j$. In the present embodiment, the sampling function value is explained by taking the "expected improvement value" as an example.

Figure 3:
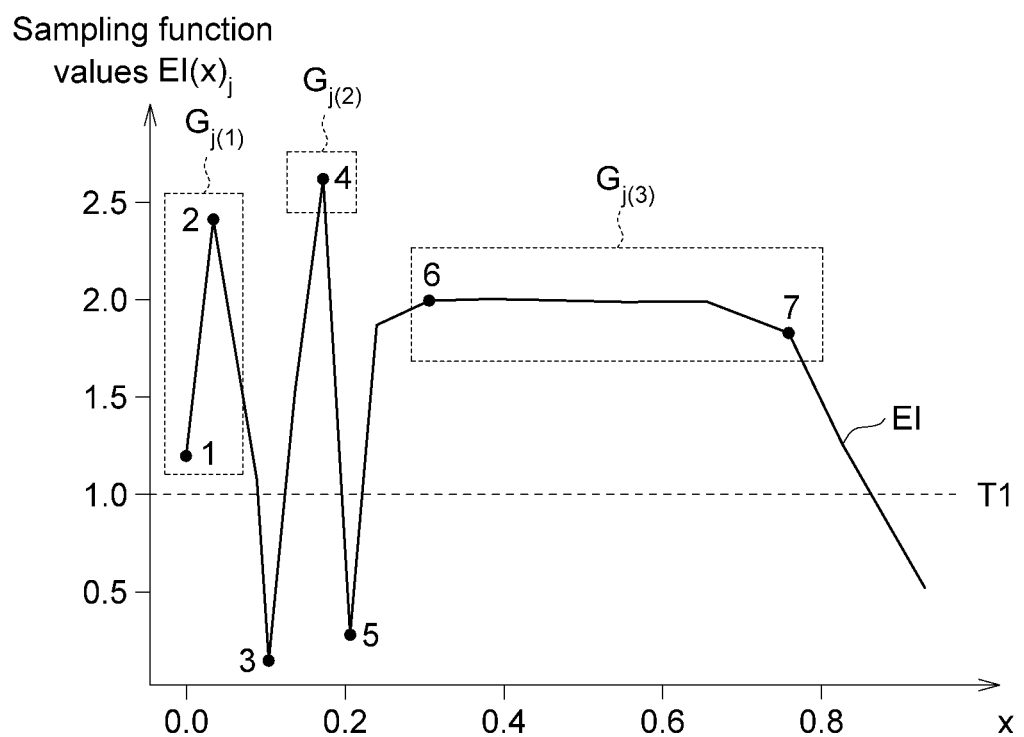
FIG. 3 shows a schematic diagram of a sampling function according to an embodiment of the present disclosure.

As shown in FIG. 3, it shows a schematic diagram of the sampling function EI according to an embodiment of the present disclosure. In figure, the axis of abscissa represents the distribution of the value x in an input parameter value space, and the axis of ordinate represents the sampling function value $EI(x)_j$ corresponding to the value x. The value x could be any integer. The sampling function EI is, for example, a curve drawn according to several sampling function values $EI(x)_j$.

The sampling function EI could be obtained through the following equation (1). In formula (1), $EI(x)_j$ represents the sampling function value corresponding to the value x of the input parameter value space, $\mu(x)$ represents a mean function obtained according to the input parameter values $X_j$ and the measurement output values $Y_j$, $y_{max}$ represents the maximum one of the measurement output values $Y_j$ in the current batch, p represents an allowable improvement value of (any integer, not limited in the embodiment of the present disclosure), Z is $(\mu(x)-y_{max})/\sigma(x)$, wherein $\Phi(Z)$ represents Gaussian cumulative distribution function obtained according to the input parameter values $X_j$ and the measurement output values $Y_j$, $\emptyset(Z)$ represents Gaussian distribution function obtained according to the input parameter values $X_j$ and the measurement output values $Y_j$, $\sigma(x)$ represents a standard deviation function obtained according to the input parameter values $X_j$ and the measurement output values $Y_j$. In addition, the mean function $\mu(x)$, Gaussian distribution function $\emptyset(Z)$ and/or the standard deviation function $\sigma(x)$ could be obtained by using general mathematical and/or statistical methods, and the method is not limited in the embodiments of the present disclosure.

$$EI(x)_j = (\mu(x) - y_{max} - p)\Phi(Z) + \sigma(x)\emptyset(Z) \quad (1)$$

The sampling function calculation module 120 could first calculates the input parameter values $X_j$ and the measurement output values $Y_j$, using appropriate mathematical and/or statistical methods, to obtain the mean function $\mu(x)$ and the Gaussian cumulative distribution function $\Phi(Z)$, the Gaussian distribution function $\emptyset(Z)$ and the standard deviation function $\sigma(x)$, and then obtains the sampling function EI by calculating, according to formula (1), the mean function $\mu(x)$, Gaussian cumulative distribution function $\Phi(Z)$, Gaussian distribution function $\emptyset(Z)$, the standard deviation function $\sigma(x)$, a maximum measurement output value $y_{max}$ and the allowable improvement value p.

In step S130, the clustering module 130 obtains a number of the parameter value groups $G_j$ according to the input parameter values $X_j$ and the sampling function values $EI(x)_j$. For example, as shown in FIG. 3, the parameter optimization device 100 or the clustering module 130 could select a number of points with different value points, from the sampling function EI, as "sampling points", and groups these "sampling points". The embodiments of the present disclosure do not limit the number and value of the sampling points. In an embodiment, the clustering module 130 could determine (or select) the sampling points (for example, randomly selected) according to a specific number, or determine the sampling points according to an interval of the values x (for example, select one sampling point for every fixed interval of the value x).

In the present embodiment, referring to FIG. 3 and Table 1, Table 1 lists the 7 sampling points of the $j^{th}$ batch and the value x of each sampling point, the sampling function values $EI(x)_j$, whether it is candidate point, neighbor variation value $V_j$, sample weight $W_j$ and the group to which it belongs, etc. Table 1 is merely an example in the present disclosure, and the number of the sampling points and/or the value of each sampling point in different embodiments depends on the actual situation and is not limited to Table 1. The neighbor variation value $V_j$ represents the degree of variation of the sampling function value $EI(x)_j$ of a sampling point in comparison with the sampling function values $EI(x)_j$ of the neighbor several (K value) sampling points. When the degree of variation is larger, it means that the neighbor variation value $V_j$ is larger, and vice versa. The neighbor variation values $V_j$ are obtained, for example, by the sampling function calculation module 120 using, for example, a calculation method of statistical variation according to the sampling function values $EI(x)_j$. The sample weight $W_j$ of the sampling point represents the product of the sampling function value $EI(x)_j$ and the neighbor variation value $V_j$ (for example, $W_j=EI(x)_j \times V_j$).

TABLE 1

| sampling point | x | sampling function value $EI(x)_j$ | candidate point | neighbor variation value $V_j$ (K = 3) | sample weight $W_j$ | clustring (parameter value group) |
|---|---|---|---|---|---|---|
| 1 | 0.00 | 1.19 | Yes | 0.54 | 0.64 | 1 |
| 2 | 0.03 | 2.41 | Yes | 0.54 | 1.30 | 1 |
| 3 | 0.10 | 0.14 | No | — | — | — |
| 4 | 0.17 | 2.62 | Yes | 0.31 | 0.81 | 2 |
| 5 | 0.21 | 0.29 | No | — | — | — |
| 6 | 0.31 | 2.00 | Yes | 0.01 | 0.02 | 3 |
| 7 | 0.76 | 1.83 | Yes | 0.15 | 0.27 | 3 |

There are a number of ways to determine the parameter value group, some of which are described below.

In the first clustering method, the "sampling function value" is used as the weight for clustering. For example, the clustering module 130 could group, using, for example, a K-means method, these sampling points according to the input parameter value $X_j$ and the sampling function value $EI(x)_j$ of each sampling point. Furthermore, in the embodiment of the present disclosure, the sampling function value $EI(x)_j$ is used as the weight, and whether the two sampling points belong to the same group is determined according to the difference between the values x of any two sampling points. The difference between the two sampling points could be interpreted (or regarded) as the distance between the two sampling points. The greater the distance between the two sampling points is, the greater the difference between the two sampling points is; otherwise, the smaller the difference. The parameter value group is obtained according to the difference of the values x and the difference of the sampling function values $EI(x)_j$ has diversity. The term "diversity" herein means that multiple groups have certain degree of difference. For example, the degree of difference in parameter value within a group is small while the degree of difference in parameter value between groups is large. Any two of the recommended parameter values determined from at least one of the parameter value groups have certain degree of difference.

In the second clustering method, the "neighbor variation value" is used as the weight for clustering. For example, the clustering module 130 could group, using, for example, a K-means method, these sampling points according to the input parameter value $X_j$ and the neighbor variation value $V_j$ of each sampling point. Furthermore, in the embodiment of the present disclosure, the neighbor variation value $V_j$ is used as the weight, and whether the two sampling points belong to the same group is determined according to the difference between the values x of any two sampling points and the difference between the sampling function values $EI(x)_j$ of any two sampling points. The parameter value group is obtained according to the difference of the values x and the difference of the sampling function values $EI(x)_j$ has diversity.

In the third clustering method, "sampling function value" and "neighbor variation value" are used as the weights for clustering. For example, the clustering module 130 could group, using, for example, a K-means method, these sampling points according to the input parameter value $X_j$, the sampling function value $EI(x)_j$ and the neighbor variation value $V_j$ of each sampling point. Furthermore, in the embodiment of the present disclosure, the sampling function value $EI(x)_j$ and the neighbor variation value $V_j$ are used as the weights, and whether the two sampling points belong to the same group is determined according to the difference between the values x of any two sampling points, the difference between the sampling function values $EI(x)_j$ of any two sampling points and the neighbor variation value $V_j$ of any two sampling points. The parameter value group is obtained according to the difference of the values x, the difference of the sampling function values $EI(x)_j$ and the neighbor variation value $V_j$ has diversity.

The clustering method in the embodiment of the present disclosure is described by the aforementioned third method. As shown in FIG. 3, according to the third clustering method, the clustering module 130 divides the sampling points into three parameter value groups, for example, the first group $G_j(1)$, the second group $G_j(2)$ and the third group $G_j(3)$.

In addition, the clustering module 130 could group some (not all) of the sampling points. As shown in Table 1 above, the clustering module 130 groups a number of sampling function values $EI(x)_j$ (referred to as "candidate points") that meet a threshold value T1. For example, the clustering module 130 only groups the sampling points 1-2, 4 and 6-7 (candidate points) that equal to or higher than the threshold value T1, but excludes the sampling points 3 and 5 (non-candidate points) smaller than the threshold value T1.

After the calculation, the sampling points 1 and 2 belong to the first group $G_j(1)$, the sampling point4 belongs to the second group $G_j(2)$, and the sampling points 6 to 7 belong to the third group $G_j(3)$. Different the sampling points and the values x thereof could produce different clustering results. In another embodiment, the clustering module 130 also could group all sampling points. In addition, the embodiment of the present disclosure does not limit the specific value of the threshold value T1.

In step S140, the parameter recommendation module 140 could obtain a number of the recommended parameter values $X'_{j+1}$ from at least one of the parameter value groups $G_j$. Since the number of the input parameter values $X_j$ of the $j^{th}$ batch (current batch) is 3, the recommended parameter values $X'_{j+1}$ of the $(j+1)^{th}$ batch (next batch) could also be 3; however, such exemplification is not meant to be for limiting. In another embodiment, the recommended parameter values $X'_{j+1}$ of the $(j+1)^{th}$ batch (next batch) could also be less than or more than three.

In an embodiment, the parameter recommendation module 140 could select, from each parameter value group $G_j$, the value x corresponding to one of a number of the sampling function values $EI(x)_j$ as the recommended parameter values $X'_{j+1}$. For example, referring to Table 1, the parameter recommendation module 140 could select, from the first group $G_j(1)$, the value x corresponding to the maximum (for example, the sampling point 2) of a number of the sampling function values $EI(x)_j$ as the recommended parameter values $X'_{j+1}$ for the next batch, select, from the second group $G_j(2)$, the value x corresponding to the maximum sampling function value $EI(x)_j$ (for example, the sampling point 4) as the recommended parameter value $X'_{j+1}$ for the next batch, and select, from the third group $G_j(3)$, the value x corresponding to the maximum sample function value $EI(x)_j$ (for example, the sampling point 6) as the recommended parameter value $X'_{j+1}$ for the next batch. For another example, the parameter recommendation module 140 could select, from each parameter value group $G_j$, the value x closest to an average value (for example, the average value of the sampling function values $EI(x)_j$) as the recommended parameter values $X'_{j+1}$ for the next batch. Alternatively, the parameter recommendation module 140 could select, from each of some (not all) of the parameter value groups $G_j$, the value x corresponding to one or a number of the sampling function values $EI(x)_j$ as the recommended parameter values $X'_{j+1}$.

In step S150, the data acquisition module 110 determines whether the recommended output values $Y'_{j+1}$ corresponding to a number of the recommended parameter values $X'_{j+1}$ meet a stop optimization condition. The method of obtaining the recommended output value $Y'_{j+1}$ is the same as that of the aforementioned measurement output values $Y_j$, and the similarities will not be repeated here. If the recommended output values $Y'_{j+1}$ has not met the stop optimization condition, it means that the recommended output value $Y'_{j+1}$ still has room or opportunity to reach the output target value, and the process proceeds to step S160 for continuing the optimization process. If the recommended output value $Y'_{j+1}$ meets the stop optimization condition, it means that the measurement output values $Y_j$ has no room or chance to reach the output target value, and accordingly the process could be ended. The data acquisition module 110 could send (or output) an optimization end message M1 (shown in FIG. 1), and uses the recommended parameter values $X'_{j+1}$ for this batch as the optimized recommended parameter value. In addition, the aforementioned stop optimization conditions are, for example: (1). the recommended parameter values $X'_{j+1}$ has reached or exceeded the output target value; (2). the difference (or the absolute value) between the recommended parameter value $X'_{j+1}$ and the output target value ranges within an allowable range; or (3). The number of iterations (repeating steps S110 to S160 are defined as one iteration) has reached a preset number of times. The embodiments of the present disclosure do not limit the specific values of the aforementioned allowable range and the preset number of times. In addition, the output target value could be pre-stored in the data acquisition module 110.

In step S160, the recommended parameter values $X'_{j+1}$ (the input parameter value in the next batch) are added to (participates in) the input parameter value $X_j$ of the current batch, and a number of the recommended output values $Y'_{j+1}$ corresponding to the recommended parameter values $X'_{j+1}$ are added to the measurement output values $Y_j$ of current batch, so that the recommended parameter values $X'_{j+1}$ become the members of the input parameter values $X_j$ and the recommended output values $Y'_{j+1}$ become the members of the measurement output values $Y_j$. In other words, in operation of the next batch, the members of the input parameter value $X_j$ participating in the operation include the input parameter values $X_j$ of the current batch (for example, the $j^{th}$ batch) and the input parameter values $X_j$ for the next batch (for example, the $(j+1)^{th}$ batch), and the members of the measurement output values $Y_j$ participating in the operation include the measurement output value $Y_j$ of the current batch (for example, the $j^{th}$ batch) and the measurement output value $Y_j$ for the next batch (for example, the $(j+1)^{th}$ batch).

Then, the process returns to step S110, the recommended parameter value $X'_{j+1}$ of the next batch is continued to be obtained by using the updated input parameter value $X_j$ (including the input parameter value $X_j$ of the current batch and the recommended parameter values $X'_{j+1}$ for the next batch) and the updated measurement output values $Y_j$ (including the measurement output values $Y_j$ of the current batch and the recommended output value $Y'_{j+1}$ for the next batch). Steps S110 to S150 are repeated according to such principle until the optimized recommended parameter value is obtained.

The verification results of applying the optimization process of the present disclosure to a chemical process are shown in Table 2 below. The conditions of the chemical process are: (1). the feed flow is 50 m³/hour and the feed concentration is 82%; (2). the parameter types of the input parameter value include, for example, the composition ratio, temperature, etc.; and (3). the "average number of iterations" is used as the verification index (for example, an average value of the total number of iterations of 10 experiments (the sum of the number of iterations required to obtain the optimized recommended parameter value for each experiment)). As shown in Table 2, the optimization process using the conventional clustering method needs 28 average iterations to obtain the optimized recommended parameter value, the optimization process using the first clustering method of the present disclosure needs merely 24 average iterations to obtain the optimized recommended parameter value (compared to the conventional clustering method, the improvement rate is 14.2%), the optimization process using the second clustering method of the present disclosure needs merely 17.8 average iterations to obtain the optimized recommended parameter value (compared to the conventional clustering method, the improvement rate is 36.4%), and the optimization process using the third clustering method of the present disclosure needs merely 18.5 average iterations to obtain the optimized recommended parameter value (compared to the conventional clustering method, the improvement rate is 33.9%). In comparison with the conventional clustering method, the three clustering methods of the embodiments of the present disclosure could effectively reduce the number of iterations or substantially maintain the number of iterations.

TABLE 2

| | clustering method | | | |
|---|---|---|---|---|
| index | conventional clustering method | the first clustering method in the present embodiment | the second clustering method in the present embodiment | the third clustering method in the present embodiment |
| average number of iterations (improvement rate) | 28.0 (—) | 24.0 (14.2%) | 17.8 (36.4%) | 18.5 (33.9%) |

To sum up, an embodiment of the present disclosure proposes a parameter optimization device and a parameter optimization method using the same that perform clustering according to at least two parameters, such as the input parameter value and the sampling function value. Therefore, the degree of difference between multiple groups could be increased, so that the recommended parameter values determined from at least one of the groups have diversity. In addition, a non-transitory computer readable medium could stores a program causing a computer to execute the aforementioned parameter optimization method.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A parameter optimization device, comprises:
a data acquisition module configured for acquiring a plurality of input parameter values and corresponding a plurality of measurement output values;
a sampling function calculation module configured for obtaining a plurality of sampling function values according to the input parameter values and the measurement output values;
a clustering module configured for obtaining a plurality of parameter value groups according to the input parameter values and the sampling function values; and
a parameter recommendation module configured for obtaining a plurality of recommended parameter values from at least one of the parameter value groups;
wherein the data acquisition module is further configured for adding the recommended parameter values to the input parameter values and adding a plurality of recommended output values corresponding to the recommended parameter values to the measurement output values so that the recommended parameter values become members of the input parameter values and the recommended output values become members of the measurement output values; the sampling function calculation module is further configured for obtaining updated the sampling function values according to updated the input parameter values and updated the measurement output values; the clustering module is further configured for obtaining updated the parameter value groups according to the updated input parameter values and the updated sampling function values; and the parameter recommendation module is further configured for obtaining the updated recommended parameter values from at least one of the updated parameter value groups;
wherein the data acquisition module, the sampling function calculation module, the clustering module and the parameter recommendation module are circuits.

2. The parameter optimization device as claimed in claim 1, wherein the sampling function calculation module is further configured for obtaining a neighboring variation value of each sampling function value, and the clustering module is further configured for obtaining the recommended parameter values according to the input parameter values, the sampling function values and the neighbor variation values.

3. The parameter optimization device as claimed in claim 2, wherein the sampling function calculation module is further configured for obtaining a plurality of sample weights by performing a product operation of each sampling function value and the corresponding neighbor variation value, and the clustering module is further configured for obtaining the parameter value groups according to the input parameter values, the sampling function values, the neighbor variation values and the sample weights.

4. The parameter optimization device as claimed in claim 1, wherein the data acquisition module is further configured for determining whether the recommended output values corresponding to the recommended parameter values meet a target output value; and sending an optimization end message if the recommended output values reach the target output value.

5. The parameter optimization device of claim 1, wherein the clustering module is further configured for obtaining the parameter value groups according to the sampling function values and the input parameter values that meet a threshold value.

6. A non-transitory computer readable medium storing a program causing a computer to execute a parameter optimization method, wherein the parameter optimization method comprises:
acquiring a plurality of input parameter values and corresponding a plurality of measurement output values;
obtaining a plurality of sampling function values according to the input parameter values and the measurement output values;
obtaining a plurality of parameter value groups according to the input parameter values and the sampling function values; and
obtaining a plurality of recommended parameter values from at least one of the parameter value groups;
wherein the parameter optimization method further comprises:
adding the recommended parameter values to the input parameter values and adding a plurality of recommended output values corresponding to the recommended parameter values to the measurement output values so that the recommended parameter values become members of the input parameter values and the recommended output values become members of the measurement output values;
obtaining updated the sampling function values according to updated the input parameter values and updated the measurement output values;
obtaining updated the parameter value groups according to the updated input parameter values and the updated sampling function values; and
obtaining the updated recommended parameter values from at least one of the updated parameter value groups.

7. The non-transitory computer readable medium as claimed in claim 6, wherein the parameter optimization method further comprises:
obtaining a neighboring variation value of each sampling function value;
obtaining the recommended parameter values according to the input parameter values, the sampling function values and the neighbor variation values.

8. The non-transitory computer readable medium as claimed in claim 7, wherein the parameter optimization method further comprises:
obtaining a plurality of sample weights by performing a product operation of each sampling function value and the corresponding neighbor variation value; and
obtaining the parameter value groups according to the input parameter values, the sampling function values, the neighbor variation values and the sample weights.

9. The non-transitory computer readable medium as claimed in claim 6, wherein the parameter optimization method further comprises:
determining whether the recommended output values corresponding to the recommended parameter values meet a target output value; and
sending an optimization end message if the recommended output values reach the target output value.

10. The non-transitory computer readable medium of claim 6, wherein the parameter optimization method further comprises:
obtaining the parameter value groups according to the sampling function values and the input parameter values that meet a threshold value.

* * * * *